(12) United States Patent
Burkman et al.

(10) Patent No.: US 11,529,875 B1
(45) Date of Patent: Dec. 20, 2022

(54) ELECTRIFIED VEHICLE CONFIGURED TO DISCONNECT BATTERY FROM LOAD

(71) Applicant: Ford Global Technologies, LLC, Dearborn, MI (US)

(72) Inventors: Wesley Edward Burkman, Dearborn, MI (US); Thomas Joseph Wand, Redmond, WA (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/490,469

(22) Filed: Sep. 30, 2021

(51) Int. Cl.
| | |
|---|---|
| *B60L 3/00* | (2019.01) |
| *H02H 3/02* | (2006.01) |
| *H02H 7/18* | (2006.01) |
| *H01H 77/04* | (2006.01) |
| *H02H 3/20* | (2006.01) |

(52) U.S. Cl.
CPC ........... *B60L 3/0046* (2013.01); *B60L 3/0069* (2013.01); *H01H 77/04* (2013.01); *H02H 3/021* (2013.01); *H02H 3/20* (2013.01); *H02H 7/18* (2013.01); *H01H 2231/026* (2013.01)

(58) Field of Classification Search
CPC ..... B60L 3/0046; B60L 3/0069; H01H 77/04; H01H 2231/026; H02H 3/021; H02H 3/20; H02H 7/18
USPC .......................................................... 361/88
See application file for complete search history.

(56) References Cited

U.S. PATENT DOCUMENTS

| | | | |
|---|---|---|---|
| 2013/0154352 A1* | 6/2013 | Tokarz | B60L 3/0046 307/9.1 |
| 2019/0092173 A1* | 3/2019 | Waag | B60L 58/10 |

FOREIGN PATENT DOCUMENTS

| | | | | |
|---|---|---|---|---|
| DE | 102012214879 A1 | | 2/2014 | |
| DE | 102014221526 A1 | * | 5/2016 | ........ H01M 10/0525 |
| DE | 102014221526 A1 | | 5/2016 | |
| WO | 0042688 A1 | | 7/2000 | |
| WO | 2020193375 A1 | | 10/2020 | |
| WO | WO-2020193375 A1 | * | 10/2020 | ................ B60L 3/04 |

OTHER PUBLICATIONS

Machine translation of Greiner et al. German Patent Document DE 102014221526 A1 May 12, 2016 (Year: 2016).*
Machine translation of Kube International Patent Document WO 2020193375 A1 Oct. 1, 2020 (Year: 2020).*

* cited by examiner

*Primary Examiner* — Kevin J Comber
(74) *Attorney, Agent, or Firm* — David B. Kelley; Carlson, Gaskey & Olds, P.C.

(57) ABSTRACT

This disclosure relates to an electrified vehicle configured to disconnect a battery from a load, and a corresponding method. An example electrified vehicle includes an array of battery cells and an electrical conductor connecting the array to a load. A disconnect is arranged along the electrical conductor. Further, the electrified vehicle includes an electronic circuit with a switch and an igniter. When a voltage drop across the electrical conductor exceeds a threshold, the switch is configured to permit current to flow from at least one of the battery cells through the igniter to trigger the disconnect thereby disconnecting the array of battery cells from the load.

11 Claims, 3 Drawing Sheets

ELECTRIFIED VEHICLE CONFIGURED TO DISCONNECT BATTERY FROM LOAD

TECHNICAL FIELD

This disclosure relates to an electrified vehicle configured to disconnect a battery from a load, and a corresponding method.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle. A high voltage traction battery pack typically powers the electric machines and other electrical loads of the electrified vehicle. The traction battery pack may include one or more groupings of interconnected battery cells.

SUMMARY

An electrified vehicle according to an exemplary aspect of the present disclosure includes, among other things, an array of battery cells and an electrical conductor connecting the array to a load. A disconnect is arranged along the electrical conductor. Further, an electronic circuit including a switch and an igniter. When a voltage drop across the electrical conductor exceeds a threshold, the switch is configured to permit current to flow from at least one of the battery cells through the igniter to trigger the disconnect thereby disconnecting the array of battery cells from the load.

In a further embodiment of the foregoing electrified vehicle, the disconnect is a pyrotechnic disconnect.

In a further embodiment of any of the foregoing electrified vehicles, the switch is a solid state switch.

In a further embodiment of any of the foregoing electrified vehicles, the switch is a silicon controlled rectifier.

In a further embodiment of any of the foregoing electrified vehicles, an anode of the silicon controlled rectifier is electrically connected via a first branch of the electronic circuit to a first node between a first one of the battery cells and a second one of the battery cells.

In a further embodiment of any of the foregoing electrified vehicles, a cathode of the silicon controlled rectifier is electrically connected via a second branch of the electronic circuit to a second node along the electrical conductor.

In a further embodiment of any of the foregoing electrified vehicles, the second branch includes the igniter between the cathode and the second node.

In a further embodiment of any of the foregoing electrified vehicles, the igniter is adjacent the pyrotechnic disconnect, when the voltage drop across the electrical conductor exceeds the threshold, the silicon controlled rectifier is configured to permit current to flow through the igniter at a level which ignites the igniter, and ignition of the igniter causes the pyrotechnic disconnect to disconnect the array of battery cells from the load.

In a further embodiment of any of the foregoing electrified vehicles, a gate of the silicon controlled rectifier is electrically connected via a third branch of the electronic circuit to a third node along the electrical conductor.

In a further embodiment of any of the foregoing electrified vehicles, the pyrotechnic disconnect is between the second and third nodes.

In a further embodiment of any of the foregoing electrified vehicles, the third branch includes a gate current limiting resistor.

In a further embodiment of any of the foregoing electrified vehicles, a Zener diode is electrically connected via a fourth branch of the electronic circuit between a fourth node and a fifth node, the fourth node is on the second branch and is between the igniter and the cathode, and the fifth node is on the third branch and is between the gate current limiting resistor and the gate.

In a further embodiment of any of the foregoing electrified vehicles, a capacitor is electrically connected via a fifth branch of the electronic circuit between a sixth node and a seventh node, the sixth node is on the second branch and is between the fourth node and the cathode, and the seventh node is on the third branch and is between the gate and the fifth node.

In a further embodiment of any of the foregoing electrified vehicles, the switch is a bipolar junction transistor.

In a further embodiment of any of the foregoing electrified vehicles, the bipolar junction transistor is an NPN transistor, a collector of the bipolar junction transistor is electrically connected via a first branch of the electronic circuit to a first node between a first one of the battery cells and a second one of the battery cells, an emitter of the bipolar junction transistor is electrically connected via a second branch of the electronic circuit to a second node along the electrical conductor, a base of the bipolar junction transistor is electrically connected via a third branch of the electronic circuit to a third node along the electrical conductor, when the voltage drop across the electrical conductor exceeds the threshold, the bipolar junction transistor is configured to permit current to flow through the first branch at a level which ignites the igniter along the first branch, and ignition of the igniter causes a pyrotechnic disconnect to break the electrical conductor thereby disconnecting the array of battery cells and the load.

In a further embodiment of any of the foregoing electrified vehicles, a capacitor is electrically connected via a fourth branch of the electronic circuit between a fifth node along the third branch and a sixth node along the second branch, a Zener diode is electrically connected via a fifth branch of the electronic circuit between a seventh node along the third branch and an eighth node along the second branch, a first resistor is arranged along the third branch between the third node and the seventh node, and a second resistor is arranged along the third branch between the fifth node and the base of the bipolar junction transistor.

In a further embodiment of any of the foregoing electrified vehicles, the switch is a passive switch.

In a further embodiment of any of the foregoing electrified vehicles, the load includes a motor.

A method according to an exemplary aspect of the present disclosure includes, among other things, disconnecting a load from an array of battery cells by igniting an igniter to trigger a disconnect along an electrical conductor. The disconnecting step includes using a switch to permit current to flow from at least one of the battery cells through the igniter when the voltage drop across the electrical conductor exceeds a threshold.

In a further embodiment of the foregoing method, the switch is a silicon controlled rectifier or a bipolar junction transistor, and the disconnect is a pyrotechnic disconnect.

DETAILED DESCRIPTION

This disclosure relates to an electrified vehicle configured to disconnect a battery from a load, and a corresponding method. An example electrified vehicle includes an array of battery cells and an electrical conductor connecting the array to a load. A disconnect is arranged along the electrical conductor. Further, the electrified vehicle includes an electronic circuit with a switch and an igniter. When a voltage drop across the electrical conductor exceeds a threshold, the switch is configured to permit current to flow from at least one of the battery cells through the igniter to trigger the disconnect thereby disconnecting the array of battery cells from the load. This disclosure provides a reliable, low cost technique for disconnecting the battery from the load. These and other benefits will be appreciated from the below description.

Figure 1:
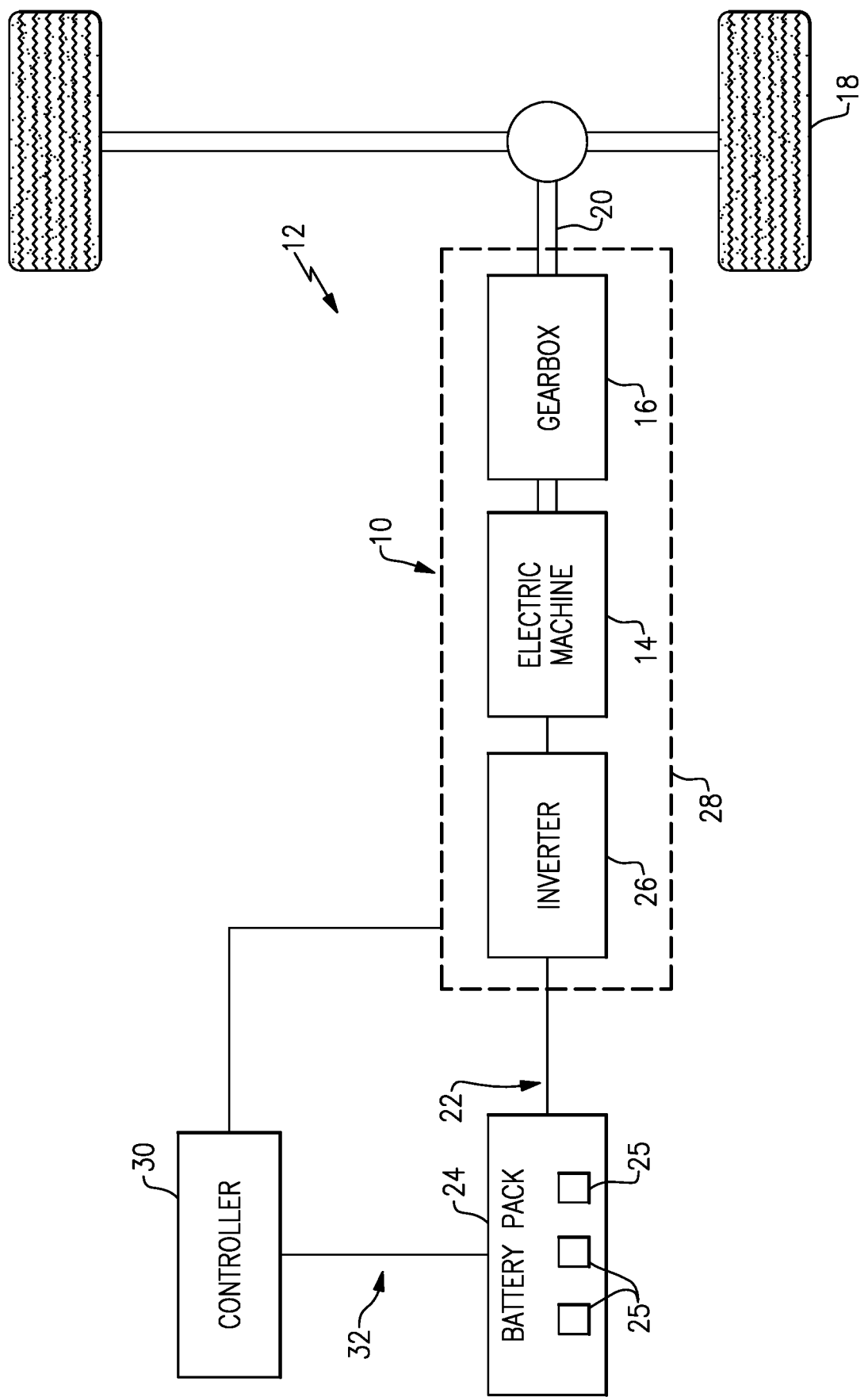
FIG. 1 schematically illustrates a powertrain of an electrified vehicle.

Referring now to the figures, FIG. 1 schematically illustrates a powertrain 10 of an electrified vehicle 12, which is shown as a battery electric vehicle (BEV). Although depicted as a BEV, it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12. Further, this disclosure extends to any hybrid or electric vehicle including full hybrids, parallel hybrids, series hybrids, mild hybrids, and micro hybrids, among others.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 may be provided by a permanent magnet synchronous motor, although other motors may be used. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 (i.e., a "battery") through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., groupings of battery cells commonly known as arrays) capable of outputting electrical power to operate the electric machine 14 and/or other electrical loads of the electrified vehicle 12. Other types of energy storage devices and/or output devices can also be used to electrically power the electrified vehicle 12. The electrified vehicle 12 may also include a charging system for periodically charging energy storage devices (e.g., battery cells) of the battery pack 24. The charging system may be connected to an external power source, such as a grid power source, for receiving and distributing power to the energy storage devices.

The inverter 26 may be an electronic device including IGBTs (insulated-gate bipolar transistors) or other switches adapted to convert direct current (DC) from the battery pack 24 to alternating current (AC). In response to instructions from a controller 30, the inverter 26 may activate one or more of its switches to convert direct current from the battery pack 24 to alternating current for the electric machine 14. Based on a desired torque output, the controller 30 sends one or more instructions to the inverter 26, which in turn is operable to direct an appropriate voltage and frequency of AC current from the battery pack 24 to the electric machine 14.

In addition to communicating with the inverter 26, the controller 30 is configured to monitor and/or control various aspects of the powertrain 10 associated with the electrified vehicle 12. The controller 30, for example, may communicate with the electric machine 14, the battery pack 24, and the inverter 26. The controller 30 may also communicate with various other vehicle components and monitor other vehicle conditions. The controller 30 includes electronics, software, or both, to perform the necessary control functions for operating the electrified vehicle 12.

In one non-limiting embodiment, the controller 30 is a combination vehicle system controller and powertrain control module (VSC/PCM). Although it is shown as a single device, the controller 30 may include multiple controllers in the form of multiple hardware devices, or multiple software controllers with one or more hardware devices. A controller area network 32 (CAN) allows the controller 30 to communicate with the various components of the electrified vehicle 12.

The electrified vehicle 12, including the powertrain 10 and other components, shown in FIG. 1 is schematic and is not intended to limit this disclosure. Various additional components could alternatively or additionally be employed by the powertrain 10 and/or the electrified vehicle 12 within the scope of this disclosure.

Figure 2:
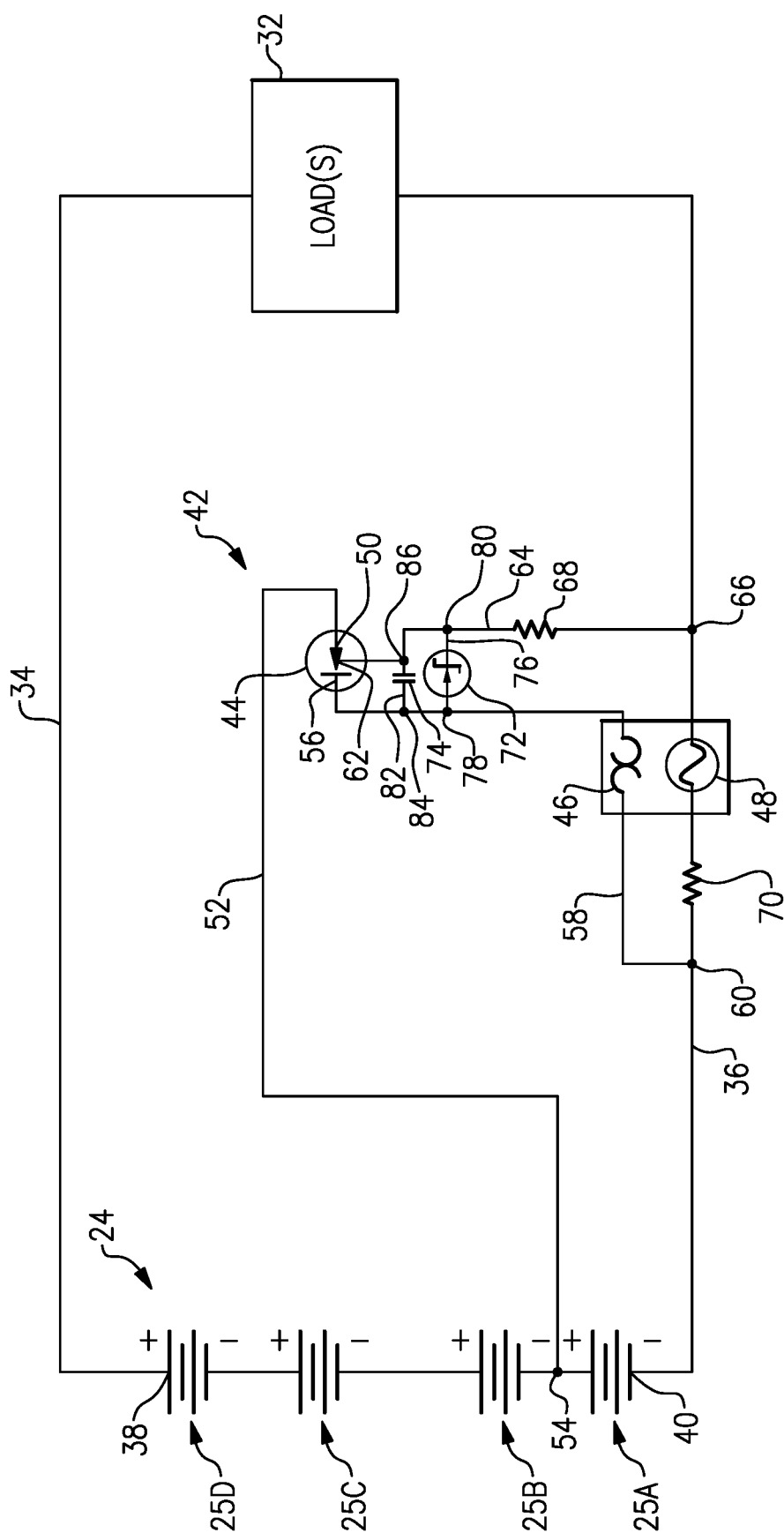
FIG. 2 schematically illustrates a first embodiment of an electronic circuit configured to disconnect a battery from a load.

FIG. 2 schematically illustrates certain aspects of the electrified vehicle 12 in more detail. In FIG. 2, the battery pack 24 includes four battery assemblies 25, labeled as a plurality of battery assemblies 25A-25D. The battery assemblies 25A-25D are electrically connected to a load 32 via a positive electrical conductor 34 and a negative electrical conductor 36. The plurality of battery assemblies 25A-25D are connected together, in series in this example, to provide an array of battery cells. Each of the battery assemblies 25A-25D is representative of a battery cell or an array of battery cells. While there are four battery assemblies 25A-25D in FIG. 2, this disclosure extends to electrified vehicles 12 with one or more battery assemblies.

The load 32 is representative of one or more electric loads of the electrified vehicle 12, including the electric machine 14 and/or any other electric loads of the electrified vehicle 12 which draw power from the battery assemblies 25A-25D.

The positive electrical conductor 34 connects the positive terminal 38 of battery assembly 25D to the load 32. The negative electrical conductor 36 connects the negative terminal 40 of the battery assembly 25A to the load 32. In an example, the positive and negative terminals 38, 40 are at opposite ends of the array of battery assemblies 25A-25D and are considered the positive and negative terminals of the entire battery pack 24. Each of the positive and negative electrical conductors 34, 36 may be provided by a plurality of electrical conductors, including a plurality of wires, busbars, connectors, etc., necessary to make the required electrical connections.

An electronic circuit 42 is configured to disconnect the battery pack 24, and in particular the battery assemblies 25A-25D, from the load 32 in response to an event such as a short circuit, which could be caused by forces applied to the electrified vehicle 12 leading to wires or busbars becoming pinched and/or severed, as examples. Alternatively, the short circuit could be caused by improper installation or malfunction one or more components, such as inverters or diodes. The electronic circuit 42 is a passive circuit, including a passive switch, and does not include or rely on any sensors, which add cost to the electrified vehicle 12. Further, the controller 30 does not actively send commands to any components of the electronic circuit 42. An example arrangement of the electronic circuit 42 will now be described.

The electronic circuit 42 includes a switch 44, which in this example is a passive switch, configured to permit current to flow from the battery assembly 25A through the electronic circuit 42 to ignite an igniter 46, which in turn triggers a disconnect 48, which in this example is a pyrotechnic disconnect. The switch 44 is configured to close when a voltage drop across the negative electrical conductor 36 exceeds a threshold, which is a predefined value corresponding to a short circuit. The switch 44 is a passive switch and is not responsive to any commands from the controller 30. Thus, the switch 44 will function even if the controller 30 ceases functioning.

In this example, the switch 44 is a solid state switch. In particular, the switch is a silicon controlled rectifier (SCR). In normal operating conditions, the switch 44 is open and current is not permitted to flow through the electronic circuit 42, and, in turn, the disconnect 48 is not triggered. Thus, in normal operating conditions, the battery assemblies 25A-25D are electrically connected to the load 32 via the negative electrical conductor 36. In response to a short circuit, however, the switch 44 closes, which permits current to flow through the electronic circuit 42 such that the igniter 46 ignites. The igniter 46 is mounted adjacent the disconnect 48 such that ignition of the igniter 46 triggers the disconnect 48. When the disconnect 48 is triggered, the battery assemblies 25A-25D are electrically disconnected from the load 32.

In one example, the igniter 46 is an electrical device used to trigger the disconnect 48. The igniter 46, in an example, includes two wires and a filament of nichrome or graphite. At a high enough current, the filament wire will heat and ignite a pyrogenous compound with which the igniter is encased. The disconnect 48 includes pyrotechnic material, in an example, which is designed to create an electrical break in response to ignition of the igniter 46. In an example, the disconnect 48 includes an initiator, a piston, and a busbar. In response to ignition of the igniter 46, the initiator, which may include pyrotechnic material, causes the piston to move through the busbar, thereby creating a break along the busbar, and in turn preventing flow of current along the busbar. The disconnect 48 may be referred to as a pyro switch, pyro fuse, or a pyrotechnic disconnect. The igniter 46 and disconnect 48 may be combined into a single component or provided as separate components.

As shown in FIG. 2, an anode 50 of the SCR is electrically connected via a first branch 52 of the electronic circuit 42 to a first node 54 between the battery assembly 25A and the battery assembly 25B. Again, the battery assemblies 25A, 25B may each consist of a single battery cell or multiple battery cells.

A cathode 56 of the SCR is electrically connected via a second branch 58 of the electronic circuit 42 to a second node 60 along the negative electrical conductor 36. The second branch 58 includes the igniter 46 between the cathode 56 and the second node 60. A gate 62 of the SCR is electrically connected via a third branch 64 of the electronic circuit 42 to a third node 66 along the negative electrical conductor 36. The disconnect 48 is arranged along the negative electrical connector 36 between the second and third nodes 60, 66. Further, the third branch 64 includes a gate current limiting resistor 68 between the third node 66 and the gate 62.

Between the second node 60 and the third node 66 a resistance is represented at element 70 in FIG. 2. The resistance at element 70 is not provided by a resistor, but is instead representative of the internal resistance of the negative electrical conductor 36 between the second and third nodes 60, 66. The internal resistance of the negative electrical conductor 36 is predetermined and known. Further, the internal resistance of the negative electrical conductor 36 is relatively low. In an example, the internal resistance of the negative electrical conductor 36 is between 0.1-0.15 Ohms. During an event that causes a short circuit, the current across the negative electrical conductor 36 is relatively large, but given the low resistance of the negative electrical conductor 36, the voltage drop across the negative electrical conductor 36 between nodes 60, 66 is relatively small.

When a voltage drop across the negative electrical conductor 36 exceeds a threshold voltage corresponding to a short circuit, a current across the gate current limiting resistor 68 also exceeds a threshold, thereby closing the switch 44, which in turn permits current to flow through the second branch 58. The threshold voltage is predetermined. Again, the threshold voltage is relatively small, and in one example is about 1.2 Volts.

When the switch 44 is closed, current flows from the battery assembly 25A through the electronic circuit 42. The battery assembly 25A is able to cause current to flow through the igniter 46 at a level that will ignite the igniter 46. Thus, this disclosure uses power from the battery pack 24 itself to trigger the disconnect 48. In this manner, a separate power supply is not required, thereby reducing cost and packaging requirements and assuring the availability of energy to drive the igniter when needed.

The electronic circuit 42 of FIG. 2 includes a Zener diode 72 and a capacitor 74 arranged in parallel to one another between the second and third branches 58, 64. The Zener diode 72, in particular, is electrically connected via a fourth branch 76 of the electronic circuit 42 between a fourth node 78 and a fifth node 80. The fourth node 78 is along the second branch 58 and is between the igniter 46 and the cathode 56. The fifth node 80 is along the third branch 64 and is between the gate current limiting resistor 68 and the gate 62. The Zener diode 72 serves to protect the switch 44 from an overvoltage.

The capacitor 74 is electrically connected via a fifth branch 82 of the electronic circuit 42 between a sixth node 84 and a seventh node 86. The sixth node 84 is along the second branch 58 and is between the fourth node 78 and the cathode 56. The seventh node 86 is on the third branch 64 and is between the gate 62 and the fifth node 80. The capacitor 74 tunes the activation time of the switch 44, and in particular prevents the switch 44 from closing in response to fast voltage spikes which may occur during normal operation of the electrified vehicle 12 and which are not be indicative of a short circuit.

Figure 3:
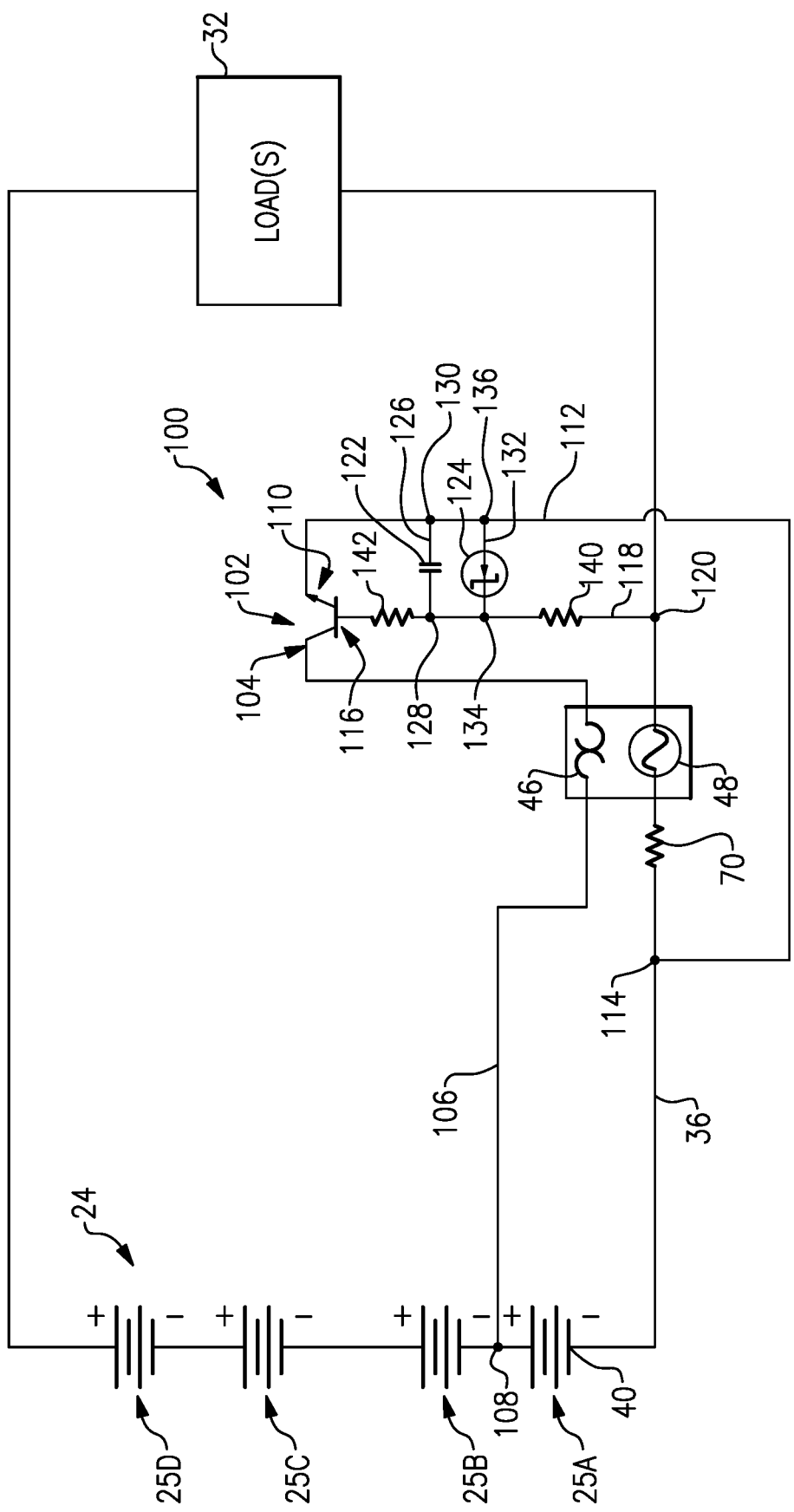
FIG. 3 schematically illustrates a second embodiment of an electronic circuit configured to disconnect a battery from a load.

Instead of an SCR, the switch 44 could be provided by another passive switch, such as a solid state switch such as a metal-oxide-semiconductor field-effect transistor (MOSFET) or bipolar junction transistor (BJT), as examples. FIG. 3 is representative of an alternative configuration of the electronic circuit 100 in which the switch 102 is a BJT. The switch 102 is a passive switch which functions without requiring commands from the controller 30. An exemplary arrangement of the electronic circuit 100 will now be described relative to the battery assemblies 25A-25D, the load 32, and the negative electrical conductor 36.

In FIG. 3, the BJT is an NPN type BJT. As shown in FIG. 3, a collector 104 of the BJT is electrically connected via a first branch 106 of the electronic circuit 100 to a first node 108 between battery assembly 25A and battery assembly 25B. An emitter 110 of the BJT is electrically connected via a second branch 112 of the electronic circuit 100 to a second node 114 along the negative electrical conductor 36. Further, a base 116 of the BJT is electrically connected via a third branch 118 of the electronic circuit 100 to a third node 120 along the negative electrical conductor 36.

When the voltage drop across the negative electrical conductor 36 exceeds the voltage threshold, the BJT is configured to permit current to flow from the battery assembly 25A through the first branch 106 at a level which ignites the igniter 46. The igniter 46 is arranged along the first branch 106. Ignition of the igniter 46 causes disconnect 48, which may be a pyrotechnic disconnect, to break the electrical connection between the battery assemblies 25A-25D and the load 32, in substantially the same manner as in FIG. 2.

The electronic circuit 100 also includes a capacitor 122 and a Zener diode 124 arranged in parallel to one another and between the second and third branches 112, 118. The capacitor 122 is electrically connected via a fourth branch 126 of the electronic circuit 100 between a fifth node 128 along the third branch 118 and a sixth node 130 along the second branch 112. The Zener diode 124 is electrically connected via a fifth branch 132 of the electronic circuit 100 between a seventh node 134 along the third branch 118 and an eighth node 136 along the second branch 112. The capacitor 122 and Zener diode 124 provide substantially the same functions as in the embodiment of FIG. 2. Further, a first resistor 140 is arranged along the third branch 118 between the third node 120 and the seventh node 134, and a second resistor 142 is arranged along the third branch 118 between the fifth node 128 and the base 116 of the BJT.

While two example electronic circuits 42, 100 have been described across FIGS. 2 and 3, modifications of the electronic circuits come within the scope of this disclosure.

In particular, if a switch other than an SCR or BJT is used, the electronic circuits 42, 100 would be modified in order to perform the functions and provide the benefits described herein.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   an array of battery cells;
   an electrical conductor connecting the array to a load, wherein a disconnect is arranged along the electrical conductor;
   an electronic circuit including a switch and an igniter, wherein, when a voltage drop across the electrical conductor exceeds a threshold, the switch is configured to permit current to flow from at least one of the battery cells through the igniter to trigger the disconnect thereby disconnecting the array of battery cells from the load,
   wherein the switch is a bipolar junction transistor,
   wherein the bipolar junction transistor is an NPN transistor,
   wherein a collector of the bipolar junction transistor is electrically connected via a first branch of the electronic circuit to a first node between a first one of the battery cells and a second one of the battery cells,
   wherein an emitter of the bipolar junction transistor is electrically connected via a second branch of the electronic circuit to a second node along the electrical conductor,
   wherein a base of the bipolar junction transistor is electrically connected via a third branch of the electronic circuit to a third node along the electrical conductor,
   wherein, when the voltage drop across the electrical conductor exceeds the threshold, the bipolar junction transistor is configured to permit current to flow through the first branch at a level which ignites the igniter along the first branch, and
   wherein ignition of the igniter causes a pyrotechnic disconnect to break the electrical conductor thereby disconnecting the array of battery cells and the load.

2. The electrified vehicle as recited in claim 1, wherein:
   a capacitor is electrically connected via a fourth branch of the electronic circuit between a fifth node along the third branch and a sixth node along the second branch,
   a Zener diode is electrically connected via a fifth branch of the electronic circuit between a seventh node along the third branch and an eighth node along the second branch,
   a first resistor is arranged along the third branch between the third node and the seventh node, and
   a second resistor is arranged along the third branch between the fifth node and the base of the bipolar junction transistor.

3. The electrified vehicle as recited in claim 1, wherein the switch is a passive switch.

4. The electrified vehicle as recited in claim 1, wherein the load includes a motor.

5. A method, comprising:
disconnecting a load from an array of battery cells by igniting an igniter to trigger a disconnect along an electrical conductor, wherein the disconnecting step includes using a switch to permit current to flow from at least one of the battery cells through the igniter when the voltage drop across the electrical conductor exceeds a threshold,
wherein the switch is a bipolar junction transistor,
wherein the bipolar junction transistor is an NPN transistor,
wherein a collector of the bipolar junction transistor is electrically connected via a first branch of an electronic circuit to a first node between a first one of the battery cells and a second one of the battery cells,
wherein an emitter of the bipolar junction transistor is electrically connected via a second branch of the electronic circuit to a second node along the electrical conductor,
wherein a base of the bipolar junction transistor is electrically connected via a third branch of the electronic circuit to a third node along the electrical conductor,
wherein, when the voltage drop across the electrical conductor exceeds the threshold, the bipolar junction transistor permits current to flow through the first branch at a level which ignites the igniter along the first branch, and
wherein ignition of the igniter causes a pyrotechnic disconnect to break the electrical conductor thereby disconnecting the array of battery cells and the load.

6. An electrified vehicle, comprising:
an array of battery cells;
an electrical conductor connecting the array to a load, wherein a disconnect is arranged along the electrical conductor;
an electronic circuit including a switch and an igniter, wherein, when a voltage drop across the electrical conductor exceeds a threshold, the switch is configured to permit current to flow from at least one of the battery cells through the igniter to trigger the disconnect thereby disconnecting the array of battery cells from the load,
wherein the disconnect is a pyrotechnic disconnect,
wherein the switch is a solid state switch,
wherein the switch is a silicon controlled rectifier,
wherein an anode of the silicon controlled rectifier is electrically connected via a first branch of the electronic circuit to a first node between a first one of the battery cells and a second one of the battery cells,
wherein a cathode of the silicon controlled rectifier is electrically connected via a second branch of the electronic circuit to a second node along the electrical conductor,
wherein the second branch includes the igniter between the cathode and the second node,
wherein the igniter is adjacent the pyrotechnic disconnect,
wherein when the voltage drop across the electrical conductor exceeds the threshold, the silicon controlled rectifier is configured to permit current to flow through the igniter at a level which ignites the igniter, and
wherein ignition of the igniter causes the pyrotechnic disconnect to disconnect the array of battery cells from the load.

7. The electrified vehicle as recited in claim 6, wherein a gate of the silicon controlled rectifier is electrically connected via a third branch of the electronic circuit to a third node along the electrical conductor.

8. The electrified vehicle as recited in claim 7, wherein the pyrotechnic disconnect is between the second and third nodes.

9. The electrified vehicle as recited in claim 7, wherein the third branch includes a gate current limiting resistor.

10. The electrified vehicle as recited in claim 9, wherein:
a Zener diode is electrically connected via a fourth branch of the electronic circuit between a fourth node and a fifth node,
the fourth node is on the second branch and is between the igniter and the cathode, and
the fifth node is on the third branch and is between the gate current limiting resistor and the gate.

11. The electrified vehicle as recited in claim 10, wherein:
a capacitor is electrically connected via a fifth branch of the electronic circuit between a sixth node and a seventh node,
the sixth node is on the second branch and is between the fourth node and the cathode, and
the seventh node is on the third branch and is between the gate and the fifth node.

* * * * *